United States Patent
Chiang et al.

(10) Patent No.: US 9,169,531 B2
(45) Date of Patent: Oct. 27, 2015

(54) RECYCLING METHOD FOR ALUMINUM DUST COLLECTION AND ALUMINUM METALLIC SMELTING SLAG

(71) Applicant: Jia xie metal Co., Ltd., Tainan (TW)

(72) Inventors: Shih-Chien Chiang, Tainan (TW); Ya-Ping Liu, Tainan (TW)

(73) Assignee: JIA XIE METAL CO., LTD., Tainan (TW)

( * ) Notice: Subject to any disclaimer, the term of this patent is extended or adjusted under 35 U.S.C. 154(b) by 115 days.

(21) Appl. No.: 14/147,855

(22) Filed: Jan. 6, 2014

(65) Prior Publication Data

US 2014/0196573 A1 Jul. 17, 2014

(30) Foreign Application Priority Data

Jan. 11, 2013 (TW) .............................. 102200600 U (51) Int. Cl.
*C22B 1/16* (2006.01)
*C22B 1/248* (2006.01)
*C22B 21/00* (2006.01)

(52) U.S. Cl.
CPC . *C22B 1/16* (2013.01); *C22B 1/248* (2013.01); *C22B 21/0007* (2013.01); *Y02W 30/54* (2015.05)

(58) Field of Classification Search
CPC ........ C22B 1/248; C22B 1/16; C22B 21/0007
See application file for complete search history.

(56) References Cited

U.S. PATENT DOCUMENTS 5,407,459 A * 4/1995 Breault et al. ................... 75/303
2012/0297926 A1* 11/2012 Hewitt ............................ 75/329

FOREIGN PATENT DOCUMENTS

| JP | 56051539 A | * 5/1981 | |
| JP | 3193213 U | * 11/2012 | |
| WO | WO 2009004565 A2 | * 1/2009 | ............... C04B 18/02 |

OTHER PUBLICATIONS

"Mesh & Micron Sizes." Mesh & Micron Sizes. Thomas Web Solutions, 2013. Web. Jul. 22, 2015. <http://www.industrialspec.com/micron-chart.html>.*

* cited by examiner

*Primary Examiner* — George Wyszomierski
*Assistant Examiner* — Tima M McGuthry Banks
(74) *Attorney, Agent, or Firm* — Jackson IPG PLLC; Demian K. Jackson (57) ABSTRACT

The present invention is a recycling method for aluminum dust collection and aluminum metallic smelting slag, where aluminum dross is processed into dross pellets having a particle diameter of larger than 200 meshes and smaller than 400 meshed, with which an aqueous solution of a binder is mixed to form a raw material. The raw material is then pressure molded to form a raw refractory material and sintered under a work temperature of 1050° C.~1450° C., and reduced in temperature to finally form a refractory material.

4 Claims, 6 Drawing Sheets

Table 1

| meshes | 100~200 mesh | > 200 mesh, < 325 mesh | > 325 mesh, < 400 mesh | > 400 mesh |
|---|---|---|---|---|
| Nitrogen | 9506 ppm | 6880 ppm | 4705 ppm | 4055 ppm |

FIG. 6

RECYCLING METHOD FOR ALUMINUM DUST COLLECTION AND ALUMINUM METALLIC SMELTING SLAG

FIELD OF THE INVENTION

The present invention relates to a recycling method for aluminum dust collection and aluminum metallic smelting slag, and particularly to a recycling method for aluminum dust collection and aluminum metallic smelting slag, capable of controlling a particle diameter of dross pellets to effectively have a reduced nitrogen containing amount of the dross pellets, reduce a phenomenon of ammonia release brought about from a reaction between water and aluminum nitride when the dross pellets are mixed with the aqueous solution to reduce crack or blast of the raw refractory material or the refractory material, whereby achieving in a lower manufacturing cost and a better surface fineness degree of the refractory material may be achieved.

DESCRIPTION OF THE RELATED ART

The present invention relates to a recycling method for aluminum dust collection and aluminum metallic smelting slag, and particularly to a recycling method for aluminum dust collection and aluminum metallic smelting slag, capable of controlling a particle diameter of dross pellets to effectively have a reduced nitrogen containing amount of the dross pellets, reduce a phenomenon of ammonia release brought about from a reaction between water and aluminum nitride when the dross pellets are mixed with the aqueous solution to reduce crack or blast of the raw refractory material or the refractory material, whereby achieving in a lower manufacturing cost and a better surface fineness degree of the refractory material may be achieved.

SUMMARY OF THE INVENTION

The present invention is a recycling method for aluminum dust collection and aluminum metallic smelting slag, and is disclosed for capable of controlling a particle diameter of dross pellets to effectively have a reduced nitrogen containing amount of the dross pellets, reduce a phenomenon of ammonia release brought about from a reaction between water and aluminum nitride when the dross pellets are mixed with the aqueous solution to reduce crack or blast of the raw refractory material or the refractory material, so that a lower manufacturing cost and a better surface of the refractory material may be achieved.

The recycling method for aluminum dust collection and aluminum metallic smelting slag according to the present invention comprising steps of (a) processing an aluminum dross into a plurality of dross pellets; (b) enabling each of the plurality of dross pellets to have a particle diameter of large than 200 meshes and smaller than 400 meshes; (c) mixing the dross pellets in the step (b) with an aqueous solution of a binder to form a raw material; (d) pressure molding the raw material to form a raw refractory material; and (e) sintering the raw refractory material at a work temperature of from 1050° C. to 1450° C., and reducing the temperature of the sintered refractory material to form a refractory material.

In a preferred embodiment, the step (b) further comprises a step (b1) of performing a nitrogen-containing examination process to ascertain that each of the plurality of dross pellets has a nitrogen containing amount of between 4,400 ppm and 7,000 ppm.

In a preferred embodiment, the aqueous solution of the binder is a mixed solution of carboxymethyl and water, the binder having a containing amount in the aqueous solution of between 3 wt % and 12 wt %.

In a preferred embodiment, the recycling method, wherein the step (d) is performed under a pressure of between 25 tons and 250 tons.

DESCRIPTION OF THE PREFERRED EMBODIMENTS

Referring to FIG. 1 to FIG. 5, in which steps (a) through (e) according to the present invention are schematically illustrated. As shown, the present invention is a recycling method for aluminum dust collections and aluminum metallic smelting slag, which comprises the following steps.

Figure 1:
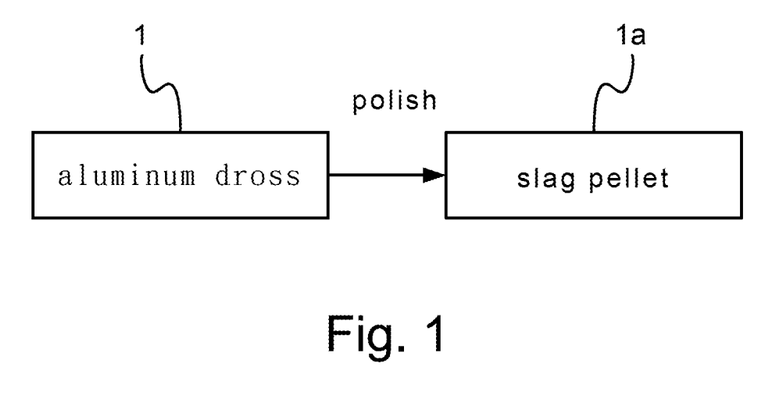
FIG. 1 is a schematic diagram of step (a) according to the present invention.

The present invention is a recycling method for aluminum dust collection and aluminum metallic smelting slag, and is disclosed for capable of controlling a particle diameter of dross pellets to effectively have a reduced nitrogen containing amount of the dross pellets, reduce a phenomenon of ammonia release brought about from a reaction between water and aluminum nitride when the dross pellets are mixed with the aqueous solution to reduce crack or blast of the raw refractory material or the refractory material, so that a lower manufacturing cost and a refiner surface of the refractory material may be achieved. At first, an aluminum dross 1 is polished into particles, thus forming dross pellets 1a (Step (a)).

Figure 2:
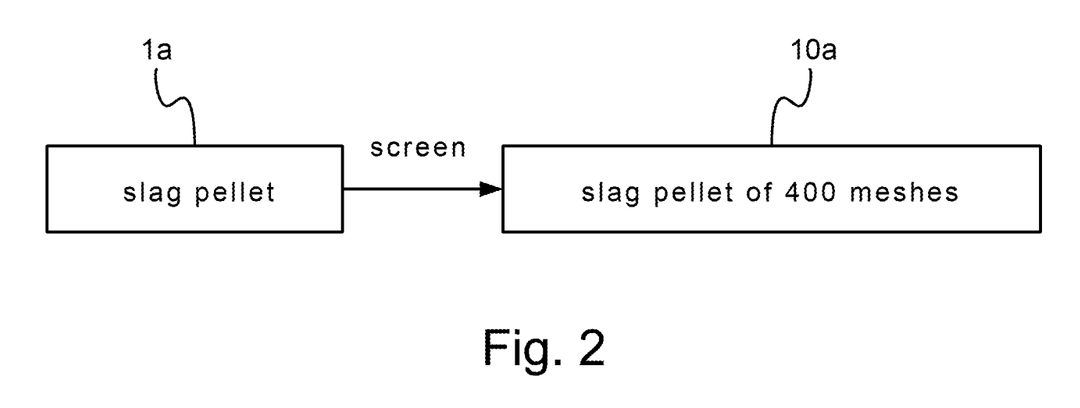
FIG. 2 is a schematic diagram of step (b) according to the present invention.

Then, the dross pellets 1a are screened to all have a particle diameter of large than 200 meshes and smaller than 400 meshes as the maintained ones (Step (b)). In an embodiment according to the present invention, dross pellets 1a having 400 meshes are screened as the dross pellets 10a for being used as a raw material of refractory bricks. Further, the dross pellets 10a of 400 meshes are subject to a nitride containing examination process to make certain a nitride containing amount of 4,000 ppm to 4,500 ppm is secured.

Figure 3:
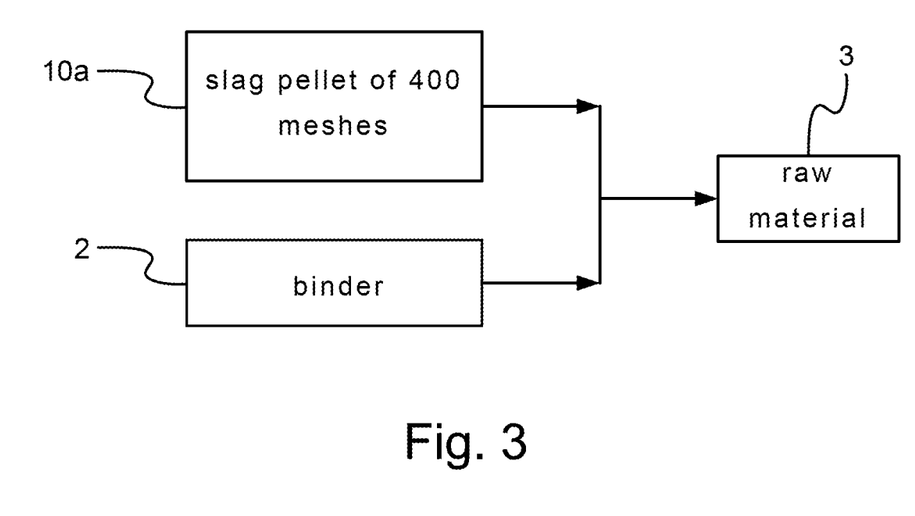
FIG. 3 is a schematic diagram of step (c) according to the present invention.

Then, the dross pellets 10a of 400 meshes are mixed with an aqueous solution of a binder 2 to form a raw material 3 (Step (c)). The aqueous solution of the binder 2 is a mixed solution of carboxymethyl cellulose and water. In this embodiment, the binder 2 in the aqueous solution has a weight percentage of 8 wt %.

Figure 4:
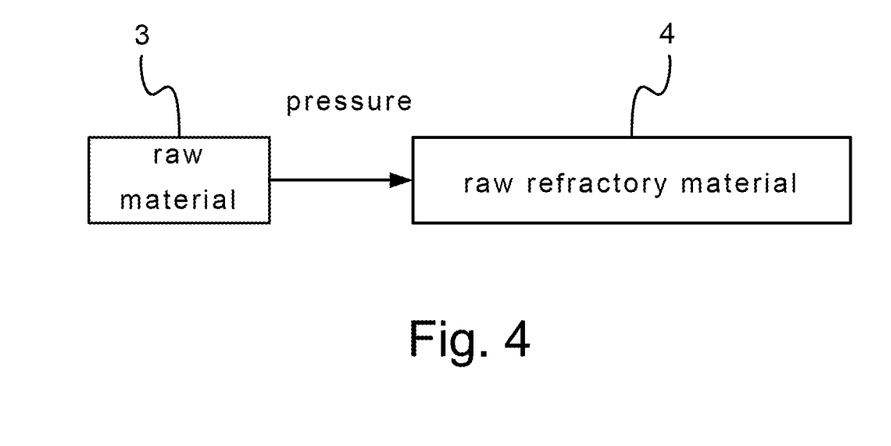
FIG. 4 is a schematic diagram of step (d) according to the present invention.

Subsequently, the raw material 3 is pressure molded with a pressure applied of 25 tons to 250 tons, to form a raw refractory material 4 (Step (d)). This process may be performed in a brick shaped mold with the pressure applied.

Figure 5:
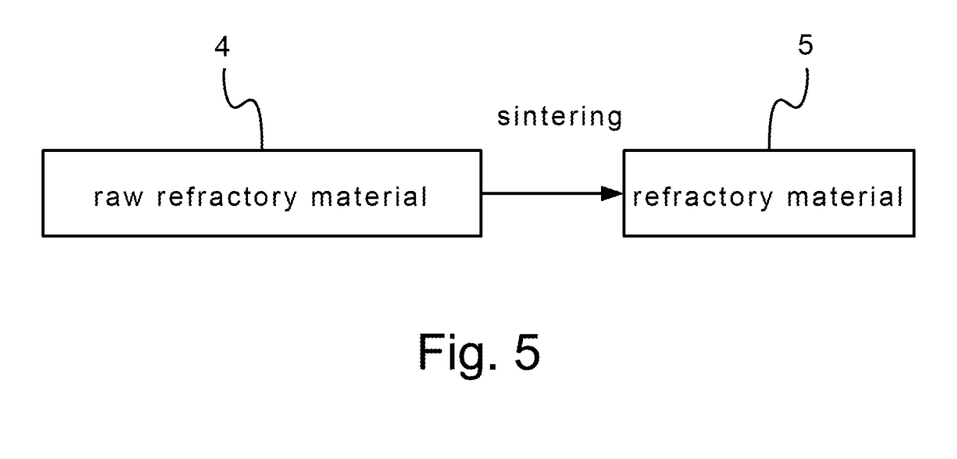
FIG. 5 is a schematic diagram of step (e) according to the present invention.

Finally, the raw refractory material 4 is sintered at a work temperature of from 1,050° C. to 1,450° C., and then reduced in its temperature to form a refractory material 5. In the sintering process, the temperature is preferably 1,400° C.

Figure 6:
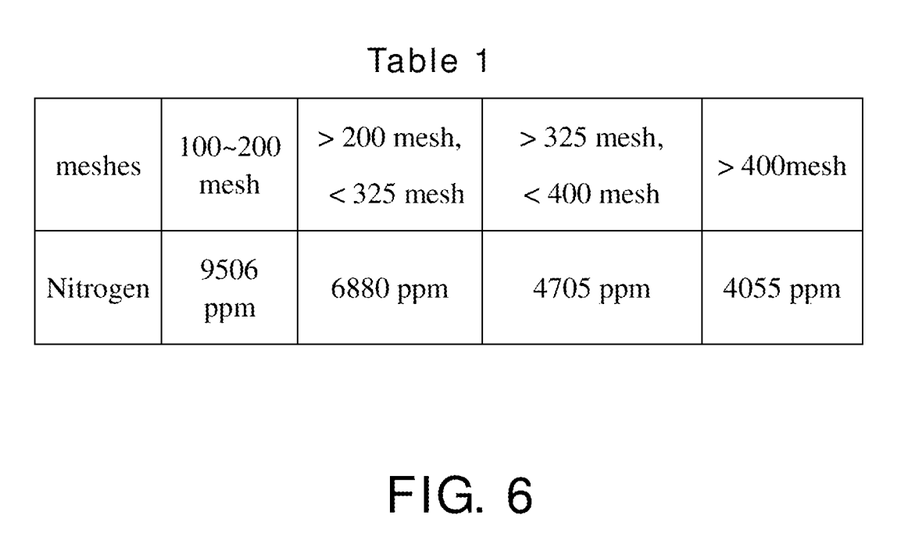
FIG. 6 is a comparison table showing nitride containing amounts of aluminum dross of different particle diameters in a relative manner according to the present invention.

FIG. 6 is a comparison table showing nitride containing amounts of aluminum dross of different particle diameters in a relative manner by using two sets of GC and three sets of detectors (vapor phase chromatograph+heat inductance detector)+(vapor phase chromatography+fire ionization+nytrogen chemical emitting detector arranged in series (GC-TCD/FID/NCD) according to the present invention. In the experiment, 10 kilograms of aluminum dross are arranged in a closed agitating device with real operational parameters introduced. An aqueous solution of a binder of carboxymethyl cellulose (CMC) is added in a specific proportion. The closed agitating device is controlled to rotate at a specific speed, and a pump is arranged at a venting hole of thereof. The air in the reactor is drawn out to a series of analysis equipment, as mentioned earlier, for continuous online analysis. From FIG. 6, it may be appreciated that is the case that the aluminum dross has the 100 to 200 meshed of the prior art, the nitrogen containing amount is 9,506 ppm, as compared to the case where the aluminum dross has the particle diameters of 200 to 325 meshed, the nitrogen containing amount is significantly reduced, 6,880 ppm. In the case that the aluminum dross has its particle diameters between 325 and 400 meshes, the nitrogen containing amount further reduces to 4,705 ppm. When the aluminum dross has the particle diameters of larger than 200 meshes, the nitrogen containing amount is only 4,405 ppm. Therefore, the particle diameters of the aluminum dross is larger than 200 meshed but smaller than 400 meshed. Compared with the prior art, the nitrogen containing amount of the present invention may be controlled to 49.49% and 72.37%, representing a significant result.

Since crack or blast is found after the aluminum dross and the binder aqueous solution are mixed and pressured to form a raw refractory material and before the sintering process, the raw refractory material of below 200 meshes has a relatively higher release of ammonia owing to its higher nitride containing amount, lending to a ratio of larger than 5% for the crack and blast's presentation.

Before the sintering process, the raw refractory material does not have any crack or blast occurring, but the refractory bricks generates crack or blast due to the ammonia release in the process of high temperature sintering. The raw refractory material of below 200 meshed has a higher nitrogen containing amount and thus a higher ammonia release, causing the proportion of crack or blast larger than 5%, compared with the case that the raw refractory material of beyond 200 meshed has a lower nitrogen containing amount and thus a lower ammonia release, causing the proportion of crack or blast smaller than 0.5%

As such, the present invention at least has the following efficacies.

By controlling the particle diameter to fall within a range of larger than 200 meshes and smaller than 400 meshes, the nitrogen containing amount of aluminum dross may be reduced to 4,705 ppm to 6,880 ppm, effectively soling the problem of crack or blast of the refractory material.

Only the polishing process, may the mentioned meshed be satisfied, lending to a lower cost and rapid processing.

The reduced nitrogen containing amount in the aluminum dross, the ammonia release of the raw refractory material may be effectively decreased correspondingly. As being specifically controlled between 200 meshes to 400 meshes of the particle diameters of the aluminum dross, the refractory bricks have a better surface fineness.

The present invention is a recycling method for aluminum dust collection and aluminum metallic smelting slag, and is disclosed for capable of controlling a particle diameter of dross pellets to effectively have a reduced nitrogen containing amount of the dross pellets, reduce a phenomenon of ammonia release brought about from a reaction between water and aluminum nitride when the dross pellets are mixed with the aqueous solution to reduce crack or blast of the raw refractory material or the refractory material, so that a lower manufacturing cost and a refiner surface of the refractory material may be achieved.

In view of the above, the recycling method for aluminum dust collection and aluminum metallic smelting slag of the present invention is capable of controlling a particle diameter of dross pellets to effectively have a reduced nitrogen containing amount of the dross pellets, reducing a phenomenon of ammonia release brought about from a reaction between water and aluminum nitride when the dross pellets are mixed with the aqueous solution to reduce crack or blast of the raw refractory material or the refractory material, so that a lower manufacturing cost and a better surface fineness degree of the refractory material may be achieved.

The above described is merely examples and preferred embodiments of the present invention, and not exemplified to intend to limit the present invention. Any modifications and changes without departing from the scope of the spirit of the present invention are deemed as within the scope of the present invention. The scope of the present invention is to be interpreted with the scope as defined in the claims.

DESCRIPTION OF THE PREFERRED EMBODIMENTS

Referring to FIG. 1 to FIG. 5, in which steps (a) through (e) according to the present invention are schematically illustrated. As shown, the present invention is a recycling method for aluminum dust collections and aluminum metallic smelting slag, which comprises the following steps.

The present invention is a recycling method for aluminum dust collection and aluminum metallic smelting slag, and is disclosed for capable of controlling a particle diameter of dross pellets to effectively have a reduced nitrogen containing amount of the dross pellets, reduce a phenomenon of ammonia release brought about from a reaction between water and aluminum nitride when the dross pellets are mixed with the aqueous solution to reduce crack or blast of the raw refractory material or the refractory material, so that a lower manufacturing cost and a refiner surface of the refractory material may be achieved. At first, an aluminum dross 1 is polished into particles, thus forming dross pellets 1a (Step (a)).

Then, the dross pellets 1a are screened to all have a particle diameter of large than 200 meshes and smaller than 400 meshes as the maintained ones (Step (b)). In an embodiment according to the present invention, dross pellets 1a having 400 meshes are screened as the dross pellets 10a for being used as a raw material of refractory bricks. Further, the dross pellets 10a of 400 meshes are subject to a nitride containing examination process to make certain a nitride containing amount of 4,000 ppm to 4,500 ppm is secured.

Then, the dross pellets 10a of 400 meshes are mixed with an aqueous solution of a binder 2 to form a raw material 3 (Step (c)). The aqueous solution of the binder 2 is a mixed solution of carboxymethyl cellulose and water. In this embodiment, the binder 2 in the aqueous solution has a weight percentage of 8 wt %.

Subsequently, the raw material 3 is pressure molded with a pressure applied of 25 tons to 250 tons, to form a raw refractory material 4 (Step (d)). This process may be performed in a brick shaped mold with the pressure applied.

Finally, the raw refractory material 4 is sintered at a work temperature of from 1,050° C. to 1,450° C., and then reduced in its temperature to form a refractory material 5. In the sintering process, the temperature is preferably 1,400° C.

FIG. 6 is a comparison table showing nitride containing amounts of aluminum dross of different particle diameters in a relative manner by using two sets of GC and three sets of detectors (vapor phase chromatograph +heat inductance detector)+(vapor phase chromatography+fire ionization+nytrogen chemical emitting detector arranged in series (GC-TCD/FID/NCD). In the experiment, 10 kilograms of aluminum dross are arranged in a closed agitating device with real operational parameters introduced. An aqueous solution of a binder of carboxymethyl cellulose (CMC) is added in a specific proportion. The closed agitating device is controlled to rotate at a specific speed, and a pump is arranged at a venting hole of thereof. The air in the reactor is drawn out to a series of analysis equipment, as mentioned earlier, for continuous online analysis. From FIG. 6, it may be appreciated that is the case that the aluminum dross has the 100 to 200 meshed of the prior art, the nitrogen containing amount is 9,506 ppm, as compared to the case where the aluminum dross has the particle diameters of 200 to 325 meshed, the nitrogen containing amount is significantly reduced, 6,880 ppm. In the case that the aluminum dross has its particle diameters between 325 and 400 meshes, the nitrogen containing amount further reduces to 4,705 ppm. When the aluminum dross has the particle diameters of larger than 200 meshes, the nitrogen containing amount is only 4,405 ppm. Therefore, the particle diameters of the aluminum dross is larger than 200 meshed but smaller than 400 meshed. Compared with the prior art, the nitrogen containing amount of the present invention may be controlled to 49.49% and 72.37%, representing a significant result.

Since crack or blast is found after the aluminum dross and the binder aqueous solution are mixed and pressured to form a raw refractory material and before the sintering process, the raw refractory material of below 200 meshes has a relatively higher release of ammonia owing to its higher nitride containing amount, lending to a ratio of larger than 5% for the crack and blast's presentation.

Before the sintering process, the raw refractory material does not have any crack or blast occurring, but the refractory bricks generates crack or blast due to the ammonia release in the process of high temperature sintering. The raw refractory material of below 200 meshed has a higher nitrogen containing amount and thus a higher ammonia release, causing the proportion of crack or blast larger than 5%, compared with the case that the raw refractory material of beyond 200 meshed has a lower nitrogen containing amount and thus a lower ammonia release, causing the proportion of crack or blast smaller than 0.5%

As such, the present invention at least has the following efficacies.

By controlling the particle diameter to fall within a range of larger than 200 meshes and smaller than 400 meshes, the nitrogen containing amount of aluminum dross may be reduced to 4,705 ppm to 6,880 ppm, effectively soling the problem of crack or blast of the refractory material.

Only the polishing process, may the mentioned meshed be satisfied, lending to a lower cost and rapid processing.

The reduced nitrogen containing amount in the aluminum dross, the ammonia release of the raw refractory material may be effectively decreased correspondingly. As being specifically controlled between 200 meshes to 400 meshes of the particle diameters of the aluminum dross, the refractory bricks have a better surface fineness.

The present invention is a recycling method for aluminum dust collection and aluminum metallic smelting slag, and is disclosed for capable of controlling a particle diameter of dross pellets to effectively have a reduced nitrogen containing amount of the dross pellets, reduce a phenomenon of ammonia release brought about from a reaction between water and aluminum nitride when the dross pellets are mixed with the aqueous solution to reduce crack or blast of the raw refractory material or the refractory material, so that a lower manufacturing cost and a refiner surface of the refractory material may be achieved.

In view of the above, the recycling method for aluminum dust collection and aluminum metallic smelting slag of the present invention is capable of controlling a particle diameter of dross pellets to effectively have a reduced nitrogen containing amount of the dross pellets, reducing a phenomenon of ammonia release brought about from a reaction between water and aluminum nitride when the dross pellets are mixed with the aqueous solution to reduce crack or blast of the raw refractory material or the refractory material, so that a lower manufacturing cost and a better surface fineness degree of the refractory material may be achieved.

The above described is merely examples and preferred embodiments of the present invention, and not exemplified to intend to limit the present invention. Any modifications and changes without departing from the scope of the spirit of the present invention are deemed as within the scope of the present invention. The scope of the present invention is to be interpreted with the scope as defined in the claims.

What is claimed is:

1. A recycling method for aluminum dust collection and aluminum metal smelting slag, comprising steps of:
   (a) processing an aluminum dross into a plurality of dross pellets;
   (b) screening the plurality of dross pellets to have a particle diameter of larger than 200 meshes and smaller than 400 meshes;
   (c) mixing the dross pellets in the step (b) with an aqueous solution of a binder to form a raw material;
   (d) pressure molding the raw material to form a raw refractory material; and
   (e) sintering the raw refractory material at a work temperature of from 1050° C., and 1450° C., and reducing the temperature of the sintered refractory material to form a refractory material,
   wherein the step (b) further comprises a step (b1) of performing a nitrogen-containing examination process and maintaining dross pellets having a nitrogen content containing amount of between 4,400 ppm and 7,000 ppm.

2. The recycling method as claimed in claim 1, wherein the aqueous solution containing 3 wt % and 12 wt % binder is a mixed solution of carboxymethyl cellulose and water.

3. The recycling method as claimed in claim 1, wherein the step (d) is performed under a pressure of between 25 tons and 250 tons.

4. A recycling method for aluminum dust collection and aluminum metal smelting slag, comprising steps of:
   (a) processing an aluminum dross into a plurality of dross pellets;
   (b) screening the plurality of dross pellets to have a particle diameter of larger than 200 meshes and smaller than 400 meshes;
   (c) mixing the dross pellets in the step (b) with an aqueous solution of a binder to form a raw material;
   (d) pressure molding the raw material to form a raw refractory material; and
   (e) sintering the raw refractory material at a work temperature of from 1050° C.,and 1450° C., and reducing, wherein the aqueous solution containing 3 wt % and 12 wt % binder is a mixed solution of carboxymethyl cellulose and water.

* * * * *